US009436308B2

United States Patent
Wadman et al.

(10) Patent No.: US 9,436,308 B2
(45) Date of Patent: Sep. 6, 2016

(54) AUTOMATIC CORRECTION OF PREDICTED TOUCH INPUT EVENTS

(71) Applicant: SONY CORPORATION, Minato-ku, Tokyo (JP)

(72) Inventors: Johan Wadman, Lund (SE); Magnus Johansson, Dösjebro (SE)

(73) Assignees: SONY CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 47 days.

(21) Appl. No.: 14/371,558

(22) PCT Filed: Nov. 28, 2013

(86) PCT No.: PCT/IB2013/002656
§ 371 (c)(1),
(2) Date: Jul. 10, 2014

(87) PCT Pub. No.: WO2015/079277
PCT Pub. Date: Jun. 4, 2015

(65) Prior Publication Data
US 2015/0293637 A1    Oct. 15, 2015

(51) Int. Cl.
*G06F 3/041*    (2006.01)
*G06F 3/0488*    (2013.01)
*G06K 9/00*    (2006.01)

(52) U.S. Cl.
CPC ......... *G06F 3/0412* (2013.01); *G06F 3/04883* (2013.01); *G06K 9/00335* (2013.01); *G06F 2203/04101* (2013.01)

(58) Field of Classification Search
CPC .. G06F 3/0412; G06F 3/0416; G06F 3/0488; G06F 3/017; G06F 3/04883; G06F 2203/04101; G06F 3/016
See application file for complete search history.

(56) References Cited

U.S. PATENT DOCUMENTS

| | | | | |
|---|---|---|---|---|
| 8,487,896 B1* | 7/2013 | Brown | ................. | G06F 3/0418 345/173 |
| 2007/0247435 A1* | 10/2007 | Benko | ................. | G06F 3/0488 345/173 |
| 2009/0122007 A1* | 5/2009 | Tsuzaki | ................ | G06F 3/0412 345/156 |
| 2010/0289826 A1* | 11/2010 | Park | ................... | G06F 3/04883 345/676 |
| 2011/0310118 A1* | 12/2011 | Asmi | ................. | G06F 3/04883 345/619 |
| 2013/0222329 A1* | 8/2013 | Larsby | ............... | G06F 3/04886 345/174 |

FOREIGN PATENT DOCUMENTS

EP    2620857 A1    7/2013
EP    2634680 A1    9/2013

OTHER PUBLICATIONS

International Search Report issued in corresponding PCT application No. PCT/IB2013/002656, dated Apr. 30, 2014, 4 pages.
Bau et al., "OctoPocus: A Dynamic Guide for Learning Gesture-Based Command Sets", proceedings of the 21st annual ACM symposium on user interface software and technology, UIST, Oct. 22, 2008.
* cited by examiner

*Primary Examiner* — Olga Merkoulova
(74) *Attorney, Agent, or Firm* — Tucker Ellis, LLP (57) ABSTRACT

Data for detected events and predicted events, associated with a user device, are stored. The detected events may be associated with inputs received via the user device, and the predicted events may represent predicted future inputs to the user device. The predicted events may be evaluated to identify an erroneous predicted event, such as a predicted event that differs significantly from a corresponding detected event or a predicted associated with a time period when no corresponding detected event occurs. The erroneous predicted events and set of other prior predicted events are selected to be discarded. For example, the selected set of prior predicted events to discard may be associated with a period of time corresponding to the erroneous predicted event. Instructions may be sent to applications executed by the user device to disregard the selected predicted events.

20 Claims, 8 Drawing Sheets

AUTOMATIC CORRECTION OF PREDICTED TOUCH INPUT EVENTS

BACKGROUND

Many computing devices, including mobile devices such as tablets and smart phones, receive input through an input device, such as a "touch screen." Multiple hardware, firmware, and software components may participate in the processing associated with the operation of an input device, such as a touch screen. For example, a touch sensing unit implemented in hardware and firmware may detect touch inputs, generate touch data describing the touch inputs, and transmit the touch data to low-level software controlled by the operating system, such as a touch screen input driver. The low-level software may perform additional processing of the touch data, such as noise filtering, before passing the processed touch data to a higher-level software module, such as an application.

The processing performed by components of a computing device may not be instantaneous. Rather, a period of time may elapse between initiation of the processing (e.g., provision of inputs to the component) and completion of the processing (e.g., provision of outputs by the component). This processing period may generally be referred to as a "latency" or "lag" of the component. Each component that participates in the processing associated with the operation of a touch screen may contribute to the total system latency, also referred to as "touch responsiveness" or "input lag. To decrease the latency, input devices, such as touch screens may use various predictive techniques to estimate, or predict, future inputs based on prior received inputs.

SUMMARY

One implementation described herein may include a device comprising: a memory configured to store: data corresponding to a detected event, wherein the detected event is associated with an input received by a user device, and data associated with a plurality of predicted events, wherein the plurality of predicted events are associated with, respectively, a plurality of times, wherein the plurality of predicted events predict inputs received by the user device, and wherein a particular predicted event, of the plurality of predicted events, is associated with a particular time of the plurality of times. The device may further include a processor configured to: determine that the particular predicted event is invalid, select predicted events from the plurality of predicted events based on determining that the particular predicted event is invalid, wherein the selected predicted events are associated with ones of the plurality of times included in a particular time period before the particular time, and cause the selected predicted events to be discarded.

In one implementation of this device, the user device may be associated with a touch screen, and the processor, when determining that the particular predicted event is invalid, may be further configured to: detect an up event in which an input device moves away from the touch screen, and determine that the particular predicted event is invalid based on detecting the up event.

In one implementation of this device, the processor, when determining that the particular predicted event is invalid, may be further configured to: determine that a first position, associated with the detected event, and a second position, associated with the particular predicted event, differ by at least a threshold amount, or determine that no input was received by the no screen device during a time period before the detected event.

In one implementation of this device, the plurality of predicted events may be generated based on the detected event.

In one implementation of this device, the processor, when selecting the predicted events from the plurality of predicted events, may be further configured to: order the plurality of predicted events based on the plurality of times, and identify, as the selected predicted events, a particular quantity of predicted events that immediately precede the particular event in the ordered plurality of predicted events.

In one implementation of this device, the processor may be further configured to: determine the particular quantity based on a frequency that the events are reported by the user device.

In one implementation of this device, the processor, when causing the selected predicted events to be discarded, may be further configured to: forward an instruction to an application to discard one or more predicted events of the selected predicted events.

In one implementation of this device, a first subset of the plurality of predicted events may be stored in a queue associated with the user device, and a second subset of the plurality of predicted events is forwarded to the application. In this implementation, the processor may be configured to: cause the queue to discard the first subset of the plurality of predicted events, and identify the one or more predicted events in the second subset of the plurality of predicted events.

Another implementation relates to method comprising: determining, by a processor, that a particular predicted event, of a plurality of predicted events, is invalid, wherein the plurality of predicted events are associated with predicted inputs received by a user device, wherein the plurality of predicted events are associated with, respectively, a plurality of times, wherein the plurality of predicted events predict inputs received by the user device, and wherein a particular predicted event, of the plurality of predicted events, is associated with a particular time of the plurality of times. The method may further include selecting, by the processor, predicted events from the plurality of predicted events based on determining that the particular predicted event is invalid, wherein the selected predicted events are associated with ones of the plurality of times included in a particular time period before the particular time; and causing, by the processor, the selected predicted events to be discarded.

In one implementation of this method, the user device is associated with a touch screen, and determining that the particular predicted event is invalid further includes: detecting an up event in which an input device moves away from the touch screen; and determining that the particular predicted event is invalid based on detecting the up event.

In one implementation of this method, determining that the particular predicted event is invalid may include identifying a detected event corresponding to an input to the user device, wherein the input is associated with the particular time; and determining that: a first location, associated with the detected event, and a second location, associated with the particular predicted event, differ by at least a threshold amount, or no input was received by the user device during a time period before the particular time.

In one implementation of this method, selecting the predicted events from the plurality of predicted events may include ordering the plurality of predicted events based on the plurality of times, and identifying, as the selected predicted events, a particular quantity of predicted events that immediately precede the particular event in the ordered plurality of predicted events.

In one implementation, the method may further comprise determining the particular quantity based on a frequency that inputs are reported by the user device.

In one implementation of this method, causing the selected predicted events to be discarded may include: forwarding an instruction to an application to discard one or more predicted events of the selected predicted events.

In one implementation of this method, a first subset of the selected predicted events may be stored in a queue associated with the user device, the one or more predicted events are included in the second subset of the selected predicted events, and the second subset of the selected predicted events is forwarded to the application. The method may further comprise causing the queue to discard the first subset of the selected predicted events.

In another implementation, a non-transitory computer-readable medium may store instructions comprising: one or more instructions that, when executed by a processor, cause the processor to: determine that a particular predicted event, of a plurality of predicted events, is invalid, wherein the plurality of predicted events are associated with an input received via a user device, wherein the plurality of predicted events are associated with, respectively, a plurality of times, and wherein a particular predicted event, of the plurality of predicted events, is associated with a particular time of the plurality of times. The one or more instructions that, when executed by a processor, may further cause the processor to select predicted events from the plurality of predicted events based on determining that the particular predicted event is invalid, wherein the selected predicted events are associated with ones of the plurality of times included in a particular time period before the particular time; and cause the selected predicted events to be discarded.

In one implementation of the non-transitory computer-readable medium, the user device may be associated with a touch screen, and the one or more instructions to determine that the particular predicted event is invalid may further include: one or more instructions the cause the processor to determine that the particular predicted event is invalid when an input device moves away from the touch screen, no input was received by the user device during a time period before the particular time, or a detected event, associated with the particular time, and the particular predicted event, differ by at least a threshold amount.

In one implementation of the non-transitory computer-readable medium, the one or more instructions to select the predicted events from the plurality of predicted events may further include: one or more instructions the cause the processor to: order the plurality of predicted events based on the plurality of times, and identify, as the selected predicted events, a particular quantity of predicted events that precede the particular event in the ordered plurality of predicted events.

In one implementation of the non-transitory computer-readable medium, the one or more instructions to cause the selected predicted events to be discarded may further include: one or more instructions the cause the processor to forward an instruction to an application to discard one or more predicted events of the selected predicted events.

In one implementation of the non-transitory computer-readable medium, a first subset of the plurality of predicted events may be stored in a queue associated with the user device, and a second subset of the plurality of predicted events may be forwarded to the application. In the implementation of the non-transitory computer-readable medium, the instructions further comprise one or more instructions the cause the processor to cause the queue to discard the first subset of the selected predicted events, and cause, via the instructions, the application to discard the one or more predicted events from the second subset of the selected predicted events.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

In one implementation, data for detected events and predicted events, associated with a touch screen device, are stored. The detected events may be associated with inputs received via the touch screen device, and the predicted events may represent predicted future inputs to the touch screen. The detected events and the predicted events may be evaluated to identify erroneous predicted events, such as a predicted event that differs significantly from a corresponding detected event. When the predicted event is determined to be invalid, the predicted events and set of other prior predicted events are selected to be discarded. For example, the selected set of prior predicted events to discard may be associated with a period of time before the invalid predicted event. Instructions may be sent to applications to disregard the selected predicted events.

Figure 1A:
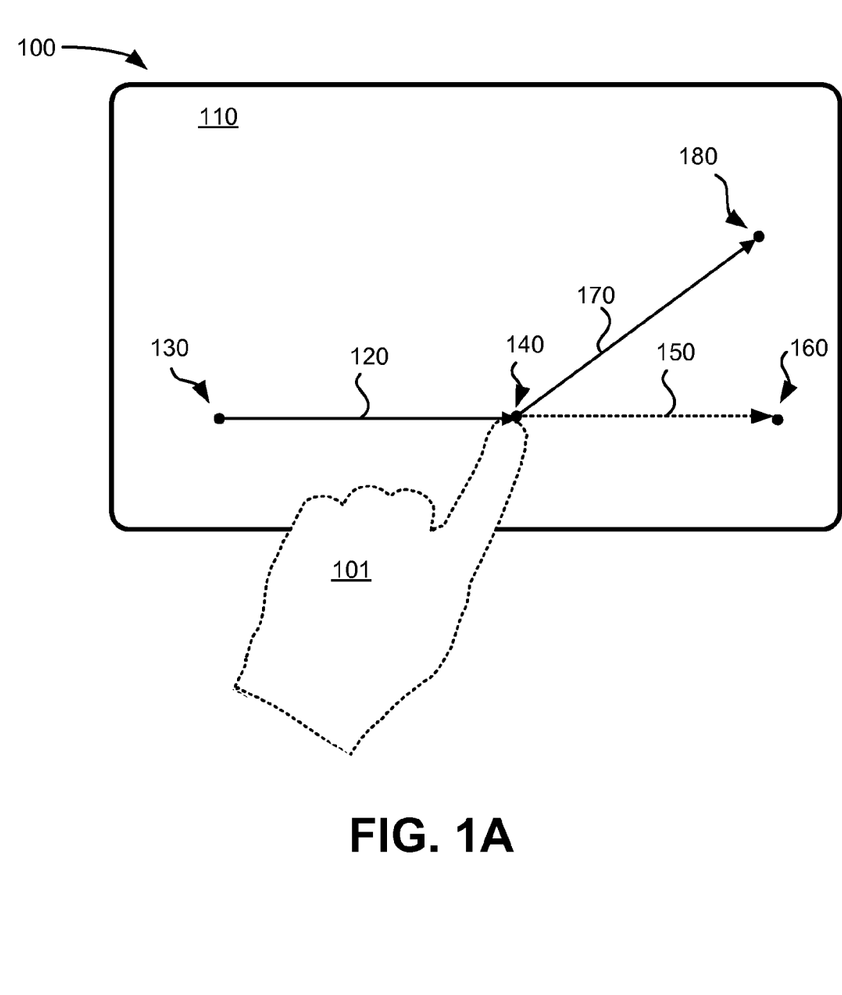
FIGS. 1A and 1B are diagrams of an exemplary system illustrating an implementation described herein.
Figure 1B:
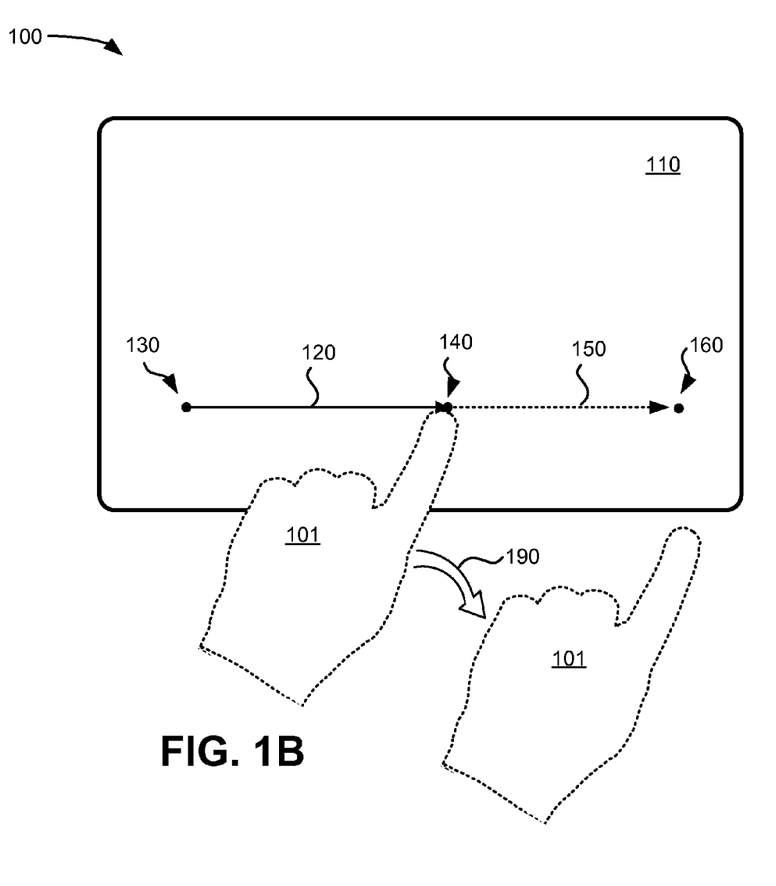

FIGS. 1A and 1B are schematic diagrams of an exemplary system 100 illustrating an implementation described herein. As shown in FIGS. 1A and 1B, system 100 may include a touch screen device 110 through which an input device 101 (such as a finger or pointer device) may select a path 120 between beginning point 130 and end point 140. Based on data associated with path 120 (e.g., the location of path 120, the direction of path 120, the velocity of input device 101, etc.), touch screen device 110 may further determine, or predict, a predicted path 150 that extends, for example, from end point 140 to a predicted point 160. For example, touch screen device 110 may predict movement of input device 101 during a subsequent time period (corresponding to predicted path 150) based on movement of input device 101 during a prior time period (corresponding to path 120). For example, touch screen device 110 may use Markov chain analysis or other statistical techniques to determine a pattern in path 120 and use this pattern to generate predicted path 150. The data associated with the predicted path 150 may be used to decrease latency and improve an overall user experience with respect to touch screen device 110. However, if touch screen device 110 determines that predicted path 150 is inaccurate, the data associated with predicted path 150 may be discarded (i.e., disregarded).

With respect to FIG. 1A, touch screen device 110 may determine that predicted path 150 is inaccurate, for example, if a portion of predicted path 150 significantly differs from a corresponding portion of an actual path 170 corresponding to the movement of input device 101 with respect to touch screen device. For example, touch screen device 110 may determine that predicted point 160 is greater than a threshold distance from a corresponding point 180 included in actual path 170. For example, input device 101 may change direction, change velocity, etc.

Touch screen device 110 may also determine that predicted path 150 is inaccurate if, for example, no path is inputted using input device 101 during an associated time period. Referring to FIG. 1B, input device 101 may stop or may pull away from (i.e., no longer contact) touch screen device 110. For example, predicted path 150 may be inaccurate if touch screen device 110 detects an "up event" in which input device 101 is removed (i.e., in direction 190) from touch screen device 110 instead of continuing along predicted path 150. For example, touch screen device 110 may include a proximity detector device to detect that input device in no longer in contact with and/or is moving away from touch screen device 110.

Touch screen device 110 may correspond, for example, to a mobile computation and/or communication device, such as a, a personal digital assistant (PDA) (e.g., that can include a radiotelephone, a pager, Internet/intranet access, etc.), a wireless device, a smart phone, a laptop computer (e.g., with a wireless air card), a global positioning system (GPS) device, a content recording device (e.g., a camera, a video camera, etc.), etc. In another example, touch screen device 110 may include a fixed (e.g., provided in a particular location, such as within a subscriber's home) computation and/or communication device, such as a laptop computer, a personal computer, a tablet computer, a set-top box (STB), a television, a gaming system, etc.

Although FIGS. 1A and 1B depict exemplary components of system 100, in other implementations, system 100 may include fewer components, additional components, different components, or differently arranged components than illustrated in FIGS. 1A and 1B. Furthermore, although system 100 is discussed with respect to predicted contacts by input device 101 to touch screen device 100, the concepts discusses can also be applied to other types of predicted inputs (e.g., keystrokes from a board or movement of a cursor by a mouse, trackball, gamepad, joystick or touch pad).

Figure 2:
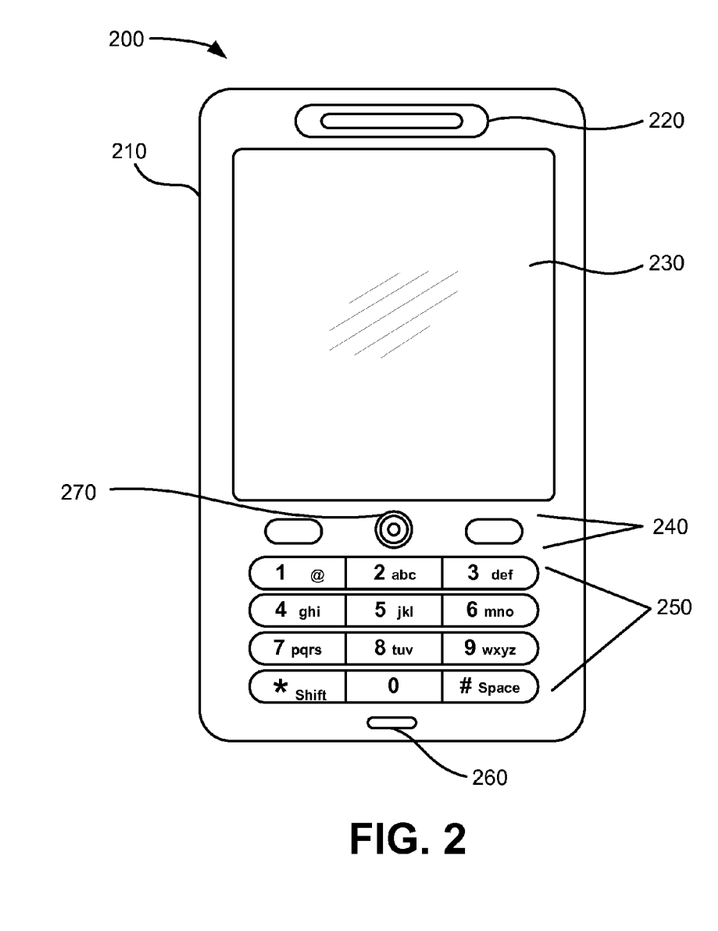
FIGS. 2-4 are exemplary schematic diagrams showing components that may be included in a touch screen device included in the system of FIGS. 1A and 1B according to implementations described herein.

FIG. 2 is shows an exemplary user device 200 that may correspond to touch screen device 110. As shown in FIG. 2, user device 200 may include a housing 210, a speaker 220, a touch screen 230, control buttons 240, a keypad 250, a microphone 260, and/or a camera 270. Housing 210 may include a chassis via which some or all of the components of user device 200 are mechanically secured and/or covered. Speaker 220 may include a component to receive input electrical signals from user device 200 and transmit audio output signals, which communicate audible information to a user of user device 200.

Touch screen 230 may include a component to receive input electrical signals and present a visual output in the form of text, images, videos and/or combinations of text, images, and/or videos which communicate visual information to the user of user device 200. In one implementation, touch screen 230 may display text input into user device 200, text, images, and/or video received from another device, and/or information regarding incoming or outgoing calls or text messages, emails, media, games, phone books, address books, the current time, etc.

Touch screen 230 may also include a component to permit data and control commands to be inputted into user device 200 via touch screen 230. For example, touch screen 230 may include a pressure sensor to detect a physical content of input device 101 to touch screen 230. Alternatively or in addition, a current and/or a field may be generated with respect to touch screen 230, and touch screen 230 may include a sensor to detect disruptions of the field and/or current associated with movements of input device 101.

Control buttons 240 may include one or more buttons that accept, as input, mechanical pressure from the user (e.g., the user presses a control button or combinations of control buttons) and send electrical signals to a processor (not shown) that may cause user device 200 to perform one or more operations. For example, control buttons 240 may be used to cause user device 200 to transmit information. Keypad 250 may include a standard telephone keypad or another arrangement of keys.

Microphone 260 may include a component to receive audible information from the user and send, as output, an electrical signal that may be stored by user device 200, transmitted to another user device, or cause the device to perform one or more operations. Camera 270 may be provided on a front or back side of user device 200, and may include a component to receive, as input, analog optical signals and send, as output, a digital image or video that can be, for example, viewed on touch screen 230, stored in the memory of user device 200, discarded and/or transmitted to another user device 200.

Although FIG. 2 depicts exemplary components of user device 200, in other implementations, user device 200 may include fewer components, additional components, different components, or differently arranged components than illustrated in FIG. 2. Furthermore, one or more components of user device 200 may perform one or more tasks described as being performed by one or more other components of user device 200.

Figure 3:
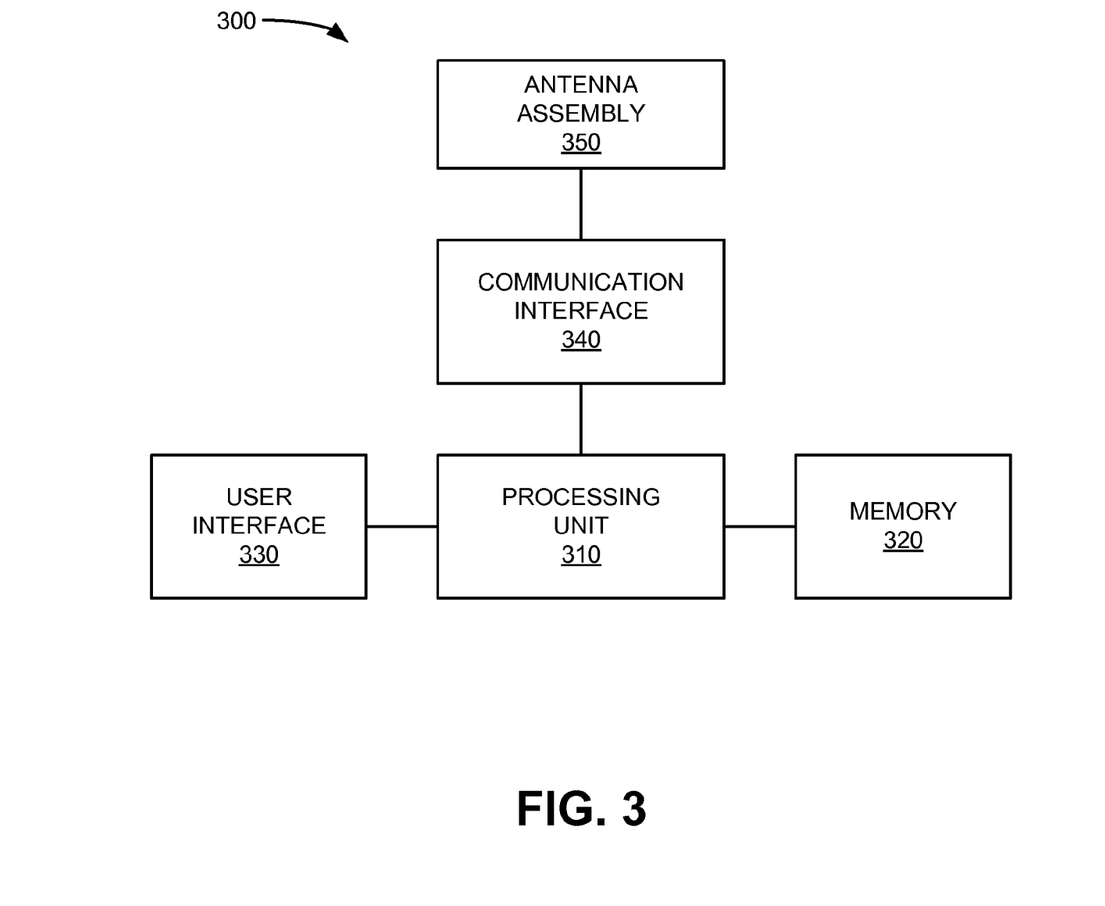

FIG. 3 is a schematic diagram that shows exemplary components of a device 300 that may correspond to touch screen device 110. As shown in FIG. 3, device 300 may include a processing unit 310, a memory 320, a user interface 330, a communication interface 340, and/or an antenna assembly 350. Although FIG. 3 shows example components of user device 200, in other implementations, user device 200 may include fewer components, additional components, different components, or differently arranged components than depicted in FIG. 3. In still other implementations, one or more components of user device 200 may perform one or more tasks described as being performed by one or more other components of user device 200.

A processing unit 310 may include a processor, a microprocessor, an ASIC, a FPGA, or the like. A processing unit 310 may control operation of user device 200 and its components. In one implementation, a processing unit 310 may control operation of components of user device 200 in a manner similar to that described herein. Memory 320 may include a RAM, a ROM, and/or another type of memory to store data and/or instructions that may be used by a processing unit 310. In one implementation, memory 320 may include a queue to store data associated with predicted events.

User interface 330 may include mechanisms for inputting information to user device 200 and/or for outputting information from user device 200. Examples of input and output mechanisms might include buttons (e.g., control buttons 240, keys of keypad 250, a keyboard, a joystick, etc.); a touch screen interface to permit data and control commands to be input into user device 200 via touch screen 230; a biometric device to receive fingerprint scans, retinal scans, facial signatures, etc.; a speaker (e.g., speaker 220) to receive electrical signals and output audio signals; a microphone (e.g., microphone 260) to receive audio signals and output electrical signals; a display (e.g., touch screen 230) to output visual information (e.g., user interfaces, web pages, etc.); a vibrator to cause user device 200 to vibrate; and/or a camera (e.g., camera 270) to receive video and/or images.

Communication interface 340 may include, for example, a transmitter that may convert baseband signals from a processing unit 310 to RF signals and/or a receiver that may convert RF signals to baseband signals. Alternatively, communication interface 340 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications. Communication interface 340 may connect to antenna assembly 350 for transmission and/or reception of the RF signals.

Antenna assembly 350 may include one or more antennas to transmit and/or receive RF signals over the air. Antenna assembly 350 may, for example, receive RF signals from communication interface 340 and transmit them over the air, and receive RF signals over the air and provide them to communication interface 340. In one implementation, for example, communication interface 340 may communicate with a network and/or devices connected to a network.

As described in detail below, device 300 may perform certain operations described herein in response to a processing unit 310 executing software instructions of an application contained in a computer-readable medium, such as memory 320. The software instructions may be read into memory 320 from another computer-readable medium or from another device via communication interface 340. The software instructions contained in memory 320 may cause a processing unit 310 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 depicts exemplary components of device 300, in other implementations, user device 300 may include fewer components, additional components, different components, or differently arranged components than illustrated in FIG. 3. Furthermore, one or more components of device 300 may perform one or more tasks described as being performed by one or more other components of device 300.

Figure 4:
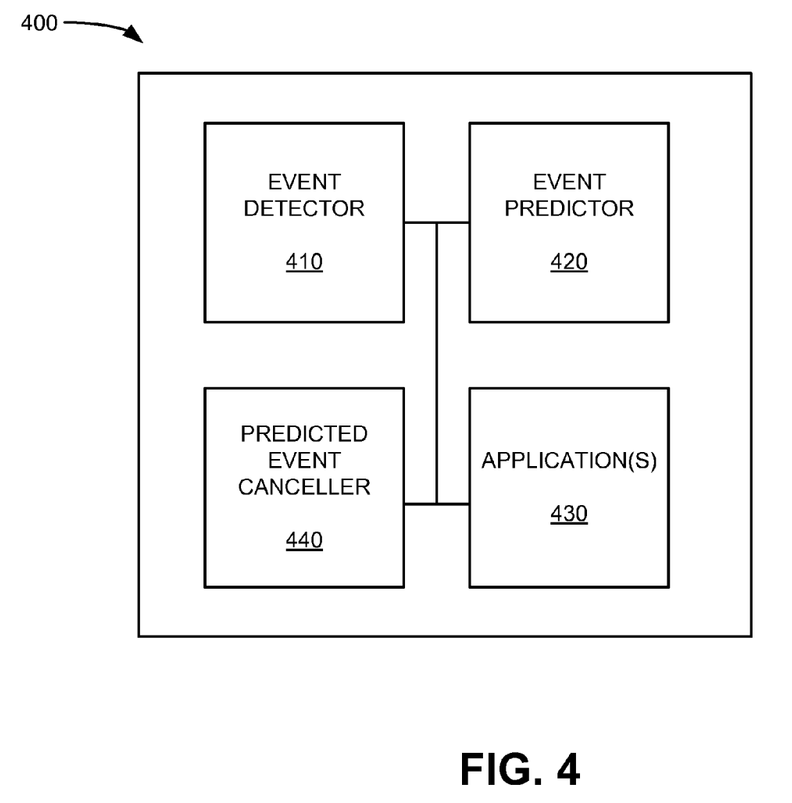

FIG. 4 depicts exemplary modules that may be included in an input device 400 that may correspond to touch screen device 110. As shown in FIG. 4, input device 400 may include, for example, an event detector 410, an event predictor 420, applications 430, and a predicted event canceller 440.

Event detector 410 may detect events associated with the movement of input device 101 with respect to touch screen device 110. Event predictor 420 may predict future inputs based on the detected events. For example, event predictor 420 may perform a statistical analysis of the events detected by event detector 410 to predict additional events that may likely occur at a future time. Applications 430 may use the events detected by events detector 410 and the predicted events generated by event predictor 420. For example, applications 430 may identify a command and/or data associated with the detected events and the predicted events and perform appropriate actions.

Figure 5:
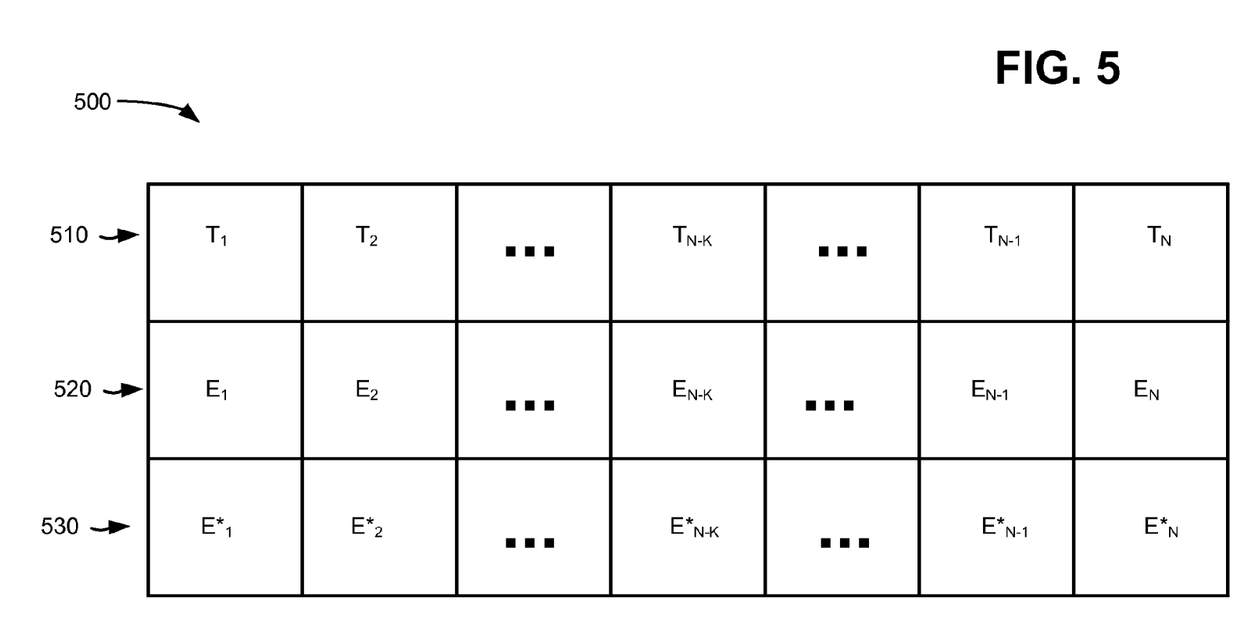
FIG. 5 is an exemplary table that stores data related to detected events and predicted events associated with touch screen device of FIGS. 2-4 according to an implementation described herein.

Referring to FIG. 5, an exemplary table 500 may store data related to the events detected by event detector 410 and predicted events generated by event predictor 420. For example, table 500 may include times 510 (referred singularly as time 510 and collectively as times 510), and table 500 is shown in FIG. 5 as including times $T_1$-$T_N$. Table 500 may further include detected events 520 (referred singularly as detected event 520 and collectively as detected events 520) detected by event detector 410 during time 510. Detected events 520 are shown in FIG. 5 as including detected events $E_1$-$E_N$. With respect to FIG. 1, detected events 520 may correspond, for example, to points on path 120 and/or actual path 170. Table 500 may further include predicted events 530 (referred singularly as predicted event 530 and collectively as predicted events 530) generated by event predictor 420. Predicted events 530 are shown in FIG. 5 as including detected events $E^*_1$-$E^*_N$. With respect to FIG. 1, predicted events 530 may correspond, for example, to points on predicted path 150.

Returning to FIG. 4, predicted event canceller 440 may identify an erroneous predicted event 530 and may further cancel the identified predicted event 530 along with other predicted events 530. For example, event canceller 440 may determine that a particular detected event $E_N$ and the corresponding predicted event $E^*_N$ differ by at least a threshold amount.

With respect to FIG. 1A, a particular detected event 520 ($E_N$) may correspond to point 180, and a particular predicted event 530 ($E^*_N$) may correspond to predicted point 160, and predicted event canceller 440 may determine that point 160 is erroneous if it is separated by at least a threshold distance (e.g., a number of pixels on touch screen device 110) from point 180.

Returning to table FIG. 5, predicted event canceller 440 may cause applications 430 to disregard a set of predicted points 530 (e.g., points before the identified erroneous predicted event 530. For example, predicted event canceller 440 may cancel some predicted events 530 that are less than a threshold distance from corresponding detected events 520, but are associated with and immediately precede a particular predicted event 530 that is more than the threshold distance from the corresponding detected event 520. Referring again to FIG. 1A, predicted event canceller 440 may cancel a portion of predicted path 150 near predicted point 160.

Predicted event canceller 440 may instruct applications 430 to disregard the K prior predicted events 530. For example, predicted event canceller 440 may cause applications 430 to disregard predicted events $E^*_{N-K}$ through $E^*_N$. In the example of FIG. 1A, predicted events $E^*_{N-K}$ through $E^*_N$ may correspond to a portion of predicted path 150 near predicted point 160.

Although FIG. 4 depicts exemplary components of input device 400, in other implementations, input device 400 may include fewer components, additional components, different components, or differently arranged components than illustrated in FIG. 4. Furthermore, one or more components of input device 400 may perform one or more tasks described as being performed by one or more other components of input device 400.

Similarly, FIG. 5 depicts exemplary data that may be included in table 500, and in other implementations, table 500 may include additional, fewer, or different data than illustrated in FIG. 5.

Figure 6:
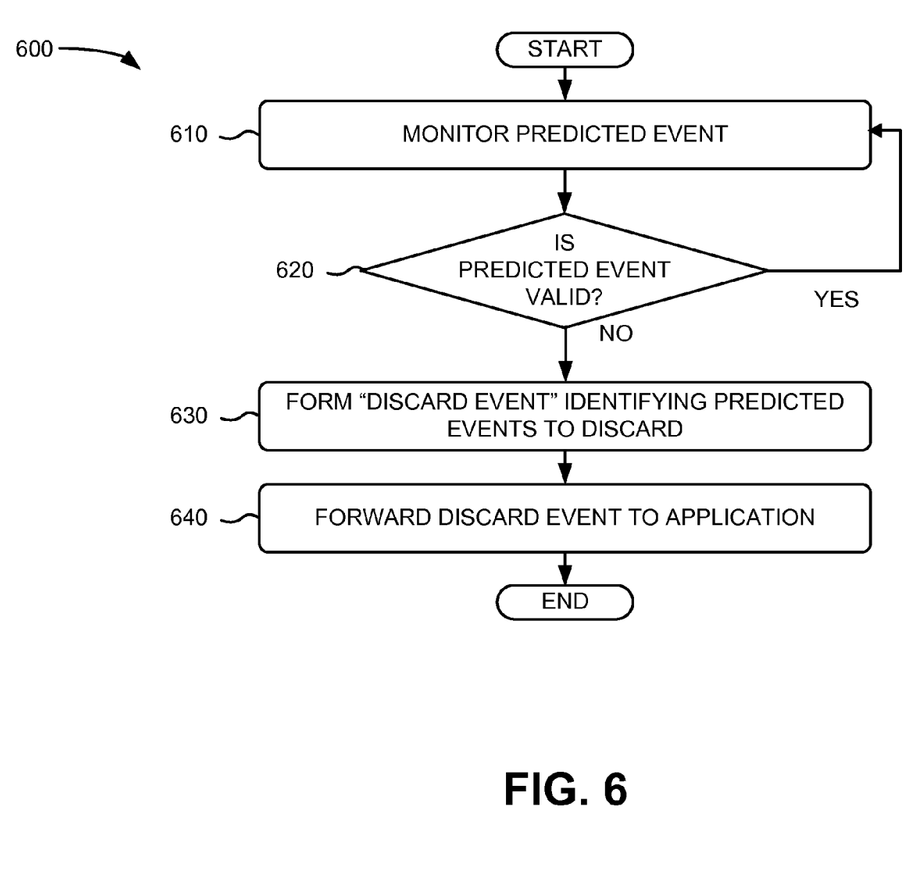
FIGS. 6 and 7 are exemplary flow diagrams showing an exemplary process for automatic correction of predicted touch input events according to an implementation described herein.

FIG. 6 is a flow chart of an exemplary process 600 for automatic correction of predicted touch input events. In one exemplary implementation, process 600 may be performed by predicted event canceller 440. In another exemplary implementation, some or all of process 600 may be performed by a device or collection of devices separate from, or in combination with, predicted event canceller 440.

As shown in FIG. 6, process 600 may include monitoring a predicted event (block 610) and determining whether the predicted event is valid (block 620). For example, predicted event canceller 440 may determine a location associated with a predicted event 530 and determine whether the predicted location differs from a location associated with a corresponding actual event 520 by at least threshold amount. For example, with respect to FIG. 1A, event canceller 440 may compare predicted point 160 and actual point 180.

In one implementation, event canceller 440 may evaluate multiple predicted events in process step 610. For example, event canceller 440 may determine a predicted direction associated with several predicted events 530, and may compare the predicted direction to a direction associated with detected events 520. For example, with respect to FIG. 1A, event canceller 440 may compare the directions associated with predicted path 150 and actual path 170.

In another implementation, predicted event canceller 440 may determine a particular time period 510 associated with a predicted event 530 and may determine whether a corresponding detected event 520 is observed during the particular time period 510. Predicted event canceller 440 may further determine, for example, whether detected events 520 are observed during at least a threshold number of time periods 510 prior to the particular time period 510.

If the predicted event is valid (block 620—YES), predicted event canceller 440 may continue to monitor the predicted events without canceling any of the predicted events.

If the predicted event is invalid (block 620—NO), predicted event canceller 440 may form a discard event, or instruction, identifying a quantity of predicted events to discard (block 630), and forward the discard event to an application 430 (block 640). For example, the cancel event may instruct applications 430 to cancel the particular invalid predicted event 530 and a particular quantity of predicted event 530 associated with one or more time periods 510 before the invalid predicted event 530.

Figure 7:
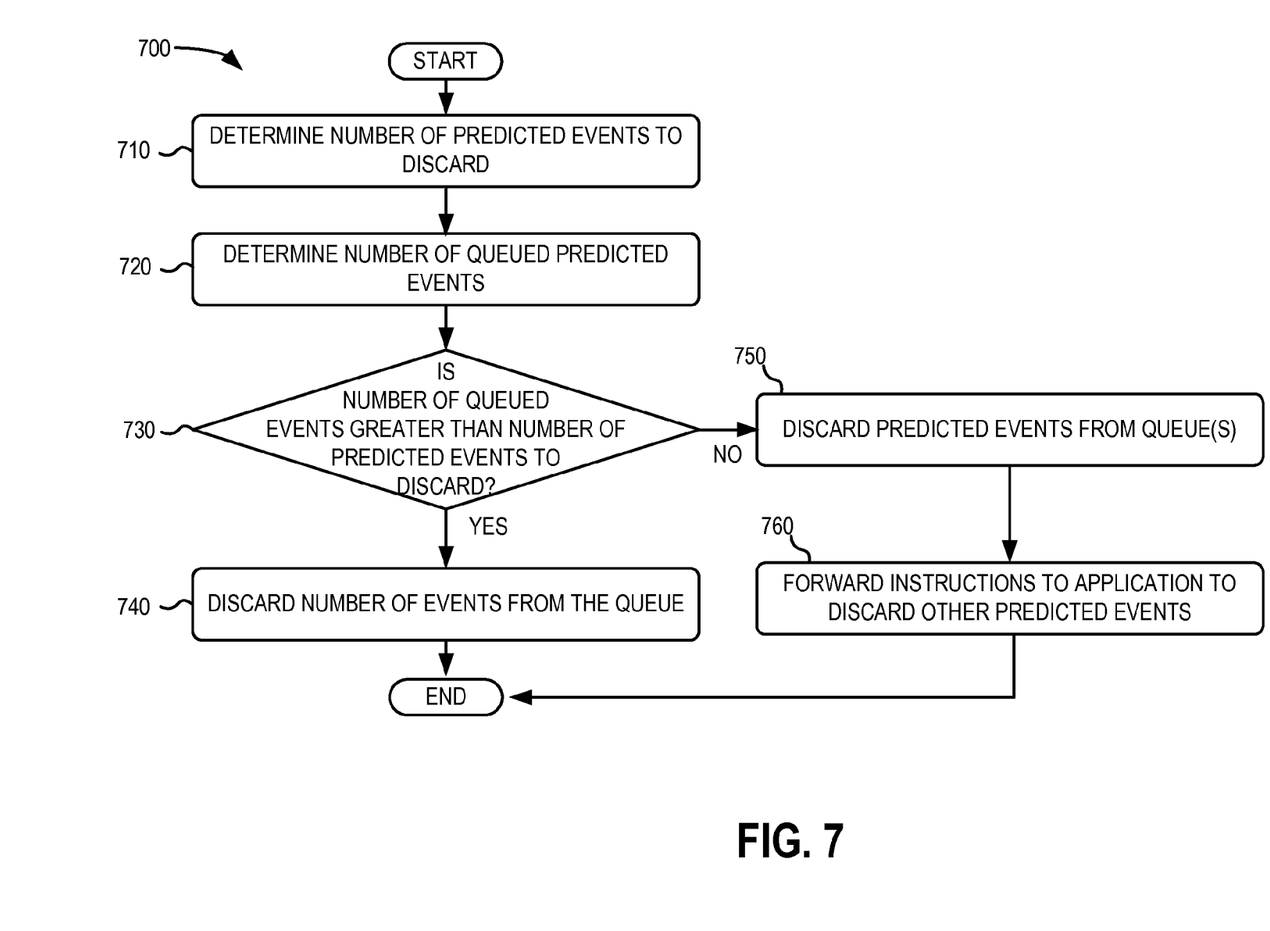

FIG. 7 is a flow chart of an exemplary process 700 that may correspond to forming the discard event in process block 630. In one exemplary implementation, process 700 may be performed by predicted event canceller 440. In another exemplary implementation, some or all of process 700 may be performed by a device or collection of devices separate from, or in combination with, predicted event canceller 440.

As shown in FIG. 7, process 700 may include determining a number of predicted events 530 to discard (block 710). The number (K) of predicted events 530 to discard may be a fixed number. In one implementation, predicted event canceller 440 may provide an interface, such as graphical user interface (GUI) to receive an input from an associated user, and predicted event canceller 440 may determine the particular quantity of predicted events 530 based on the received input.

In another implementation, the quantity (K) of predicted events 530 to discard may correspond to predicted events during a particular time frame (e.g., a number of time periods 510). For example, predicted event canceller 440 may cancel the predicted events 530 associated with a quantity ($Q_T$) of time periods prior to the invalid predicted event 530. Predicted event canceller 440 may determine K based on a frequency that associated with touch screen device 110, or $Frequency_{Device}$. (i.e., a number of reported events per time period), according to expression 1:

$$K = Frequency_{Device} \times Q_T \qquad \text{(Expression 1)}.$$

For example, if touch screen device 110 forms 0.5 predicted events per millisecond (ms), or 500 Hz, and the predicted events during 20 ms are to be discarded, event canceller 440 may cancel 0.5×20 predicted events, or 10 predicted events. If touch screen device 110 forms 100 predicted events per ms, event canceller 440 may identify 100×20 predicted events, or 2000 predicted events to discard.

Continuing with process 700, predicted event canceller 440 may determine a number of predicted events stored in a queue (e.g., in memory 320) in touch screen device 110 (block 720), and predicted event canceller 440 may determine whether the number of queued predicted events exceeds the number of predicted events to discard (block 730). In process step 720, predicted event canceller 440 may determine the number of predicted events 530 stored in the queue based on a fill level (e.g., an amount of data stored in the queue) and an amount of data to store each of the predicted events 530. For example, if a queue stores 50 Mb of data related to predicted events 530 and each predicted event is associated with 2 Mb of data, the queue may be storing data related to 25 predicted events.

If the number of queued predicted events exceeds the number (K) of predicted events to be discarded (block 730—YES), predicted event canceller 440 may cause K predicted events to be removed from the queue and not provided to applications 430 (block 740). In other words, predicted event canceller 440 may remove a portion of the queued predicted events.

If the number of queued predicted events does not exceed the number of predicted events to discard (block 730—NO), predicted event canceller 440 may clear the predicted events stored in the queue (block 750) and may instruct applications 430 to discard a particular quantity of other predicted events (block 760). For example, if 100 predicted events 530 are to be canceled, and 60 predicted events 530 are stored in the queue, predicted event canceller 440 may clear the queue (to discard the 60 queued predicted events 530). In this example, predicted event canceller 440 may further form a cancel event that causes the applications 430 to discard another 100–60, or 40 predicted events 530. For example, the predicted event canceller 440 may form an instruction causes applications 440 to discard a number of previously predicted events 530.

The foregoing description provides illustration and description, but is not intended to be exhaustive or to limit the implementations to the precise form disclosed. Modifications and variations are possible in light of the above teachings or may be acquired from practice of the embodiments.

While series of blocks have been described with regard to FIGS. 6 and 7, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Further, certain portions, described above, may be implemented as a component or logic that performs one or more functions. A component or logic, as used herein, may include hardware, such as a processor, an ASIC, or a FPGA, or a combination of hardware and software (e.g., a processor executing software).

It should be emphasized that the terms "comprises" and "comprising," when used in this specification, are taken to specify the presence of stated features, integers, steps or components but do not preclude the presence or addition of one or more other features, integers, steps, components or groups thereof.

Even though particular combinations of features are recited in the claims and/or disclosed in the specification, these combinations are not intended to limit the disclosure of the embodiments. In fact, many of these features may be combined in ways not specifically recited in the claims and/or disclosed in the specification. Although each dependent claim listed below may directly depend on only one other claim, the disclosure of the embodiments includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
    a memory configured to store:
        data corresponding to a first detected event associated with a first input received by a user device and data corresponding to a second detected event associated with a second input received by the user device, and
        data associated with a plurality of predicted events that are generated based on the first detected event and that predict inputs received by the user device, wherein each predicted event is associated with a corresponding prediction time; and
    a processor configured to:
        determine whether the second detected event that corresponds to one of the predicted events occurs during the prediction time of the one of the predicted events,
        determine that the one of the predicted events is invalid based on a determination that the second detected event and the corresponding one of the predicted events differ by a predetermined threshold,
        select predicted events from the plurality of predicted events based on determining that the one of the predicted events is invalid, wherein the selected predicted events are associated with the prediction times that occur before the prediction time of the one of the predicted events, and
        cause the selected predicted events to be discarded.

2. The device of claim 1, wherein the user device is associated with a touch screen, and
    wherein the processor, when determining that the one of the predicted events is invalid, is further configured to:
        detect an up event in which a device inputting a touch to the user device moves away from the touch screen, and
        determine that the one of the predicted events is invalid based on detecting the up event.

3. The device of claim 1, wherein the processor, when determining that the one of the predicted events is invalid, is further configured to:
    determine that a first position, associated with the second detected event, and a second position, associated with the one of the predicted events, differ by at least a predetermined threshold.

4. The device of claim 1, wherein the processor, when selecting the predicted events from the plurality of predicted events, is further configured to:
    order the plurality of predicted events based on the prediction times, and
    identify the selected predicted events to be discarded, where the selected predicted events are a quantity of predicted events that immediately precede the one of the predicted events in the ordered plurality of predicted events.

5. The device of claim 4, wherein the processor is further configured to:
    determine the quantity based on a frequency that the events are reported by the user device.

6. The device of claim 1, wherein the processor, when causing the selected predicted events to be discarded, is further configured to:
    forward an instruction to an application to discard one or more predicted events of the selected predicted events.

7. The device of claim 6, wherein a first subset of the plurality of predicted events is stored in a queue associated with the user device, and a second subset of the plurality of predicted events is forwarded to the application, and
    wherein the processor is further configured to:
        cause the queue to discard the first subset of the plurality of predicted events, and
        identify the one or more predicted events in the second subset of the plurality of predicted events.

8. The device of claim 1, wherein the processor, when determining that the one of the predicted events is invalid, is further configured to determine that no input was received by the user device during a time period before the second detected event.

9. A method comprising:
    determining, by a processor, whether a second detected event that corresponds to one of a plurality of predicted events occurs during a prediction time of the one of the plurality of predicted events, wherein the plurality of predicted events are generated based on a first detected events and predict input received b a user device, and wherein each predicted event is associated with a corresponding prediction time;
    determining, by a processor, that one of the plurality of predicted events is invalid based on a determination that the second detected event and the corresponding one of the predicted events differ by a predetermined threshold;
selecting, by the processor, predicted events from the plurality of predicted events based on determining that the one of the predicted events is invalid, wherein the selected predicted events are associated with the prediction times that occur before the prediction time of the one of the predicted events; and
causing, by the processor, the selected predicted events to be discarded.

10. The method of claim 9, wherein the user device is associated with a touch screen, and wherein determining that the one of the predicted events is invalid further includes:
detecting an up event in which a device inputting a touch to the user device moves away from the touch screen; and
determining that the one of the predicted events is invalid based on detecting the up event.

11. The method of claim 9, wherein determining that the one of the predicted events is invalid includes:
determining that:
a first location, associated with the second detected event, and a second location, associated with the one of the predicted events, differ by at least a predetermined threshold, or
no input was received by the user device during a time period before the second detected event.

12. The method of claim 9, wherein selecting the predicted events from the plurality of predicted events includes:
ordering the plurality of predicted events based on the prediction times, and
identifying the selected predicted events to be discarded, where the selected predicted events are a quantity of predicted events that immediately precede the one of the predicted events in the ordered plurality of predicted events.

13. The method of claim 12, further comprising:
determining the quantity based on a frequency that inputs are reported by the user device.

14. The method of claim 9, wherein causing the selected predicted events to be discarded includes: forwarding an instruction to an application to discard one or more predicted events of the selected predicted events.

15. The method of claim 14, wherein a first subset of the selected predicted events is stored in a queue associated with the user device, the one or more predicted events are included in the second subset of the selected predicted events, and the second subset of the selected predicted events is forwarded to the application,
wherein the method further comprises:
causing the queue to discard the first subset of the selected predicted events.

16. A non-transitory computer-readable medium to store instructions comprising:
one or more instructions that, when executed by a processor, cause the processor to:
determine whether a second detected event that corresponds to one of a plurality of predicted events occurs during a prediction time of the one of the plurality of predicted events, wherein the plurality of predicted events are enerated based on a first detected event and predict input received b a user device, and wherein each predicted event is associated with a corresonding prediction time
determine that one of the plurality of predicted events is invalid based on a determination that the second detected event and the corresponding one of the predicted events differ by a predetermined threshold;
select predicted events from the plurality of predicted events based on determining that the one of the predicted events is invalid, wherein the selected predicted events are associated with the prediction times that occur before the prediction time of the one of the predicted events; and
cause the selected predicted events to be discarded.

17. The non-transitory computer-readable medium of claim 16, wherein the user device is associated with a touch screen, and wherein the one or more instructions to determine that the one of the predicted events is invalid further include:
one or more instructions the cause the processor to determine that the one of the predicted events is invalid when:
a device inputting a touch to the user device moves away from the touch screen,
no input was received by the user device during a time period before the second predicted event.

18. The non-transitory computer-readable medium of claim 16, wherein the one or more instructions to select the predicted events from the plurality of predicted events further include:
one or more instructions the cause the processor to:
order the plurality of predicted events based on the prediction times, and
identify the selected predicted events to be discarded, where the selected predicted events are a quantity of predicted events that precede the one of the predicted events in the ordered plurality of predicted events.

19. The non-transitory computer-readable medium of claim 16, wherein the one or more instructions to cause the selected predicted events to be discarded further include:
one or more instructions the cause the processor to:
forward an instruction to an application to discard one or more predicted events of the selected predicted events.

20. The non-transitory computer-readable medium of claim 19, wherein a first subset of the plurality of predicted events is stored in a queue associated with the user device, and a second subset of the plurality of predicted events is forwarded to the application,
wherein the instructions further comprise:
one or more instructions the cause the processor to:
cause the queue to discard the first subset of the selected predicted events, and
cause, via the instructions, the application to discard the one or more predicted events from the second subset of the selected predicted events.

* * * * *